United States Patent [19]

Reitmeier et al.

[11] 4,442,545
[45] Apr. 10, 1984

[54] COMPACTION OF TELEVISION DISPLAY GRAPHICS IN PHANTOM-RASTER-SCANNED IMAGE MEMORY

[75] Inventors: Glenn A. Reitmeier, Trenton, N.J.; Christopher H. Strolle, Philadelphia, Pa.

[73] Assignee: RCA Corporation, New York, N.Y.

[21] Appl. No.: 305,174

[22] Filed: Sep. 24, 1981

[30] Foreign Application Priority Data

May 27, 1981 [GB] United Kingdom ................. 8116111

[51] Int. Cl.³ ............................................. G06K 9/00
[52] U.S. Cl. .................................... 382/56; 340/799; 358/133; 358/260; 364/518; 382/44
[58] Field of Search ........................ 382/54, 56, 44–47; 358/133–140, 260–262; 340/789, 798, 799, 802; 364/518–523, 570, 900

[56] References Cited

U.S. PATENT DOCUMENTS

| | | | |
|---|---|---|---|
| 3,480,943 | 11/1969 | Manser | 340/324 |
| 3,582,905 | 6/1971 | Krantz | 340/172.5 |
| 3,627,921 | 12/1971 | Weller | 382/56 |
| 3,686,631 | 8/1972 | Elliott | 382/56 |
| 3,921,135 | 11/1975 | Komaru et al. | 382/56 |
| 3,987,412 | 10/1976 | Morrin | 340/146.3 |
| 4,011,556 | 3/1977 | Tochitani et al. | 340/324 AD |
| 4,020,462 | 4/1977 | Morrin | 340/146.3 |
| 4,068,224 | 1/1979 | Bechtle et al. | 340/324 AD |
| 4,074,254 | 2/1978 | Belser et al. | 340/324 AD |
| 4,125,873 | 11/1978 | Chesarek | 364/900 |
| 4,146,874 | 3/1979 | Ide et al. | 382/56 |
| 4,181,973 | 1/1980 | Tseng | 364/900 |
| 4,288,816 | 9/1981 | Kashioka et al. | 382/56 |
| 4,369,463 | 1/1983 | Anastassiou et al. | 382/56 |

*Primary Examiner*—Leo H. Boudreau
*Attorney, Agent, or Firm*—Joseph S. Tripoli; George E. Haas; Allen LeRoy Limberg

[57] ABSTRACT

Phantom raster scanning of an image memory, in which the image is stored in compacted form, is made possible by introducing offsets in strictly spatial coordinates, rather than in time coordinates parallelling a particular spatial coordinate system.

6 Claims, 9 Drawing Figures

| Phantom Raster Coordinate | Offset | Display Memory Coordinate | Bit to Read-Enable AND Gate | Phantom Raster Scan Coordinate Range Limits | |
|---|---|---|---|---|---|
| | | | | ≤ | > |
| 00000 | DON'T | DON'T | 0 | 00000 | 00010 |
| 00001 | CARE | CARE | 0 | | |
| 00010 | 1110 | 0000 | 1 | | |
| 00011 | 1110 | 0001 | 1 | | |
| 00100 | 1110 | 0010 | 1 | 00010 | 00111 |
| 00101 | 1110 | 0011 | 1 | | |
| 00110 | 1110 | 0100 | 1 | | |
| 00111 | DON'T | DON'T | 0 | | |
| 01000 | CARE | CARE | 0 | 000111 | 01010 |
| 01001 | | | 0 | | |
| 01010 | 1011 | 0101 | 1 | | |
| 01011 | 1011 | 0110 | 1 | 01010 | 01110 |
| 01100 | 1011 | 0111 | 1 | | |
| 01101 | 1011 | 1000 | 1 | | |
| 01110 | | | 0 | | |
| 01111 | | | 0 | | |
| 10000 | DON'T | DON'T | 0 | | |
| 10001 | CARE | CARE | 0 | 01110 | 10110 |
| 10010 | | | 0 | | |
| 10011 | | | 0 | | |
| 10100 | | | 0 | | |
| 10101 | | | 0 | | |
| 10110 | 0011 | 1001 | 1 | | |
| 10111 | 0011 | 1010 | 1 | | |
| 11000 | 0011 | 1011 | 1 | | |
| 11001 | 0011 | 1100 | 1 | 10110 | 11101 |
| 11000 | 0011 | 1100 | 1 | | |
| 11011 | 0011 | 1110 | 1 | | |
| 11000 | 0011 | 1111 | 1 | | |
| 11101 | DON'T | DON'T | 0 | | |
| 11110 | CARE | CARE | 0 | 11101 | |
| 11111 | | | 0 | | |

*Fig. 7*

| Phantom Raster Coordinate | Offset | Display Memory Coordinate | Bit to Read-Enable AND Gate | Phantom Raster Scan Coordinate Range Limits | |
|---|---|---|---|---|---|
| αβγδε | | αβγε | | ≤ | > |
| 00000 | 0000 | 0000 | 1 | | |
| 00001 | 0000 | 0001 | 1 | 00000 | 00100 |
| 00010 | 0000 | 0010 | 1 | | |
| 00011 | 0000 | 0011 | 1 | | |
| 00100 | | | 0 | | |
| 00101 | DON'T | DON'T | 0 | 00100 | 01000 |
| 00110 | CARE | CARE | 0 | | |
| 00111 | | | 0 | | |
| 01000 | 1100 | 0100 | 1 | | |
| 01001 | 1100 | 0101 | 1 | 01000 | 01100 |
| 01010 | 1100 | 0110 | 1 | | |
| 01011 | 1100 | 0111 | 1 | | |
| 01100 | | | 0 | | |
| 01101 | DON'T | DON'T | 0 | 01100 | 10000 |
| 01110 | CARE | CARE | 0 | | |
| 01111 | | | 0 | | |
| 10000 | 1000 | 1000 | 1 | | |
| 10001 | 1000 | 1001 | 1 | 10000 | 10100 |
| 10010 | 1000 | 1010 | 1 | | |
| 10011 | 1000 | 1011 | 1 | | |
| 10100 | | | 0 | | |
| 10101 | DON'T | DON'T | 0 | 10100 | 11000 |
| 10110 | CARE | CARE | 0 | | |
| 10111 | | | 0 | | |
| 11000 | 0100 | 1100 | 1 | | |
| 11001 | 0100 | 1101 | 1 | 11000 | 11100 |
| 11010 | 0100 | 1110 | 1 | | |
| 11011 | 0100 | 1111 | 1 | | |
| 11100 | | | 0 | | |
| 11101 | DON'T | DON'T | 0 | 11100 | |
| 11110 | CARE | CARE | 0 | | |
| 11111 | | | 0 | | |

*Fig. 8*

| Phantom Raster Coordinate | Offset | Display Memory Coordinate | Bit to Read-Enable AND Gate Pattern | | | | | | | |
|---|---|---|---|---|---|---|---|---|---|---|
| $\alpha\beta\gamma\delta\epsilon$ | | $\alpha\beta\delta\epsilon$ | 1 | 2 | 3 | 4 | 5 | 6 | 7 | 8 |
| 00000 | 0000 | 0000 | 1 | 0 | 0 | 0 | 0 | 0 | 0 | 1 |
| 00001 | 0000 | 0001 | 1 | 1 | 0 | 0 | 0 | 0 | 0 | 1 |
| 00010 | 0000 | 0010 | 1 | 1 | 1 | 0 | 0 | 0 | 0 | 0 |
| 00011 | 0000 | 0011 | 1 | 1 | 1 | 0 | 0 | 0 | 0 | 0 |
| 00100 | 1100 | 0000 | 0 | 1 | 1 | 1 | 1 | 1 | 1 | 0 |
| 00101 | 1100 | 0001 | 0 | 0 | 1 | 1 | 1 | 1 | 1 | 0 |
| 00110 | 1100 | 0010 | 0 | 0 | 0 | 1 | 1 | 1 | 1 | 1 |
| 00111 | 1100 | 0011 | 0 | 0 | 0 | 1 | 1 | 1 | 1 | 1 |
| 01000 | 1100 | 0100 | 1 | 0 | 0 | 0 | 1 | 1 | 1 | 1 |
| 01001 | 1100 | 0101 | 1 | 1 | 0 | 0 | 1 | 1 | 1 | 0 |
| 01010 | 1100 | 0110 | 1 | 1 | 1 | 0 | 1 | 0 | 1 | 0 |
| 01011 | 1100 | 0111 | 1 | 1 | 1 | 0 | 1 | 0 | 0 | 0 |
| 01100 | 1000 | 0100 | 0 | 1 | 1 | 1 | 0 | 0 | 0 | 0 |
| 01101 | 1000 | 0101 | 0 | 0 | 1 | 1 | 0 | 0 | 0 | 1 |
| 01110 | 1000 | 0110 | 0 | 0 | 0 | 1 | 0 | 1 | 0 | 1 |
| 01111 | 1000 | 0111 | 0 | 0 | 0 | 1 | 0 | 1 | 1 | 1 |
| 10000 | 1000 | 1000 | 1 | 0 | 0 | 0 | 0 | 1 | 1 | 1 |
| 10001 | 1000 | 1001 | 1 | 1 | 0 | 0 | 0 | 1 | 1 | 0 |
| 10010 | 1000 | 1010 | 1 | 1 | 1 | 0 | 0 | 1 | 1 | 0 |
| 10011 | 1000 | 1011 | 1 | 1 | 1 | 0 | 0 | 1 | 0 | 0 |
| 10100 | 0100 | 1000 | 0 | 1 | 1 | 1 | 1 | 0 | 0 | 0 |
| 10101 | 0100 | 1001 | 0 | 0 | 1 | 1 | 1 | 0 | 0 | 1 |
| 10110 | 0100 | 1010 | 0 | 0 | 0 | 1 | 1 | 0 | 0 | 1 |
| 10111 | 0100 | 1011 | 0 | 0 | 0 | 1 | 1 | 0 | 1 | 1 |
| 11000 | 0100 | 1100 | 1 | 0 | 0 | 0 | 1 | 0 | 1 | 1 |
| 11001 | 0100 | 1101 | 1 | 1 | 0 | 0 | 1 | 0 | 1 | 0 |
| 11010 | 0100 | 1110 | 1 | 1 | 1 | 0 | 1 | 1 | 0 | 0 |
| 11011 | 0100 | 1111 | 1 | 1 | 1 | 0 | 1 | 1 | 0 | 0 |
| 11100 | 0000 | 1100 | 0 | 1 | 1 | 1 | 0 | 1 | 0 | 1 |
| 11101 | 0000 | 1101 | 0 | 0 | 1 | 1 | 0 | 1 | 0 | 1 |
| 11110 | 0000 | 1110 | 0 | 0 | 0 | 1 | 0 | 0 | 1 | 1 |
| 11111 | 0000 | 1111 | 0 | 0 | 0 | 1 | 0 | 0 | 1 | 1 |

*Fig. 9*

COMPACTION OF TELEVISION DISPLAY GRAPHICS IN PHANTOM-RASTER-SCANNED IMAGE MEMORY

The present invention relates to the storage of TV display graphics in image memories addressed by column and by row, omitting null information in the display graphic to facilitate compaction of the data to be stored in memory.

In this disclosure an "image" memory is a memory addressed by row and by column by the orthogonal coordinates descriptive of points in an image space. These coordinates are spatial coordinates; and they can be considered separately from a temporal coordinate descriptive, in terms of successive intervals of time, of which of the successive points of TV display screen raster scan picture trace is at. Such separate consideration departs from the standard practice where points in image space are interchangably described in terms of position on display screen in spatial coordinates or in terms of the temporal coordinate of video signal used to control picture trace on the raster-scanned display screen. Such interchangability is only possible so long as the temporal coordinate of video signal as folded by raster-scan forms a parallel coordinate system with the spatial coordinates descriptive of an image space. That is, the successive points described in terms of temporal coordinates must be successively arranged in scan lines parallel to one of the spatial coordinate axes.

In a graphic display television system, the image memory may be addressed by column using partial addresses supplied from a column address counter, which counts at picture-element ("pixel" for short) scan rate, and by row using partial addresses supplied from a row address counter, which counts at line advance rate. If change in the graphic display is concentrated in only predetermined regions of the display screen, with null or non-changing information between these regions, there can be a compaction of the graphic image to omit regions with null information before it is stored in display memory. This reduces the number of storage locations that are required in the image memory to store the graphic image. But, when the image memory is read, appropriate measures must be taken to insert the regions of null or non-changing information between the regions of stored graphic image information. Therefore, when the image memory is read, the column address counter is halted during vertical intervals during which nothing but null or non-changing information is scanned, and the row address counter is halted during the horizontal intervals during which nothing but null or non-changing information is scanned.

The foregoing technique for addressing an image memory storing a compacted graphic image relies on the memory being scan-addressed by advancing column-by-column in each row, or scan line, and row-by-row in each display field. This relationship must obtain in order that the raster-scan spatial coordinates the memory is addressed in and the temporal coordinates the address counters count in are parallel coordinate systems. Then, since the display screen is raster-scanned in spatial coordinates that also parallel those temporal coordinates, the spatial information in the memory maps without distortion into the display through the synchronized raster scanning of memory and display screen spatial coordinates. That is, the raster scanning of both image memory and display screen are carried forward in an x, y Cartesian coordinate system, x axis being the horizontal axis of the display screen (presuming it to be upright in position) and y axis being the vertical axis of the display screen.

Suppose the display raster is scan-converted to express the raster in a system of orthogonal coordinates different from x, y Cartesian coordinates. This other system may be a Cartesian coordinate system rotated respective to the x, y Cartesian coordinate system or may be a polar coordinate system, by way of example. This scan-converted display raster is referred to as a "phantom raster" in the art, and the scan-converted coordinates are used as partial addresses for the columns and rows of an image memory storing graphic images according to the scan-converted coordinate system. The scan-converted spatial coordinates do not parallel the temporal coordinates of display raster scan, assuming the scan conversion to consist of more than simple translation in the x, y coordinate system.

This makes run length encoding techniques of display compaction impossible, and it complicates the scanning of bit-map image memory storing a compacted graphic image. Since the scanning of addresses in the scan-converted coordinate does not progress in a linear series, one cannot generate display memory addresses from address counters counting respective ones of the scan-converted coordinates. The use of intermittently halted address counters prior to scan conversion is not a good solution for generating image memory addressing discontinuous in time, because the halting of the address counters to match the discontinuities in available memory involves substantial calculation, particularly where the scan conversion algorithms may change—e.g. as occurs in a graphic display system where the graphic images are programmably rotated, compressed, or expanded on the display screen.

The present invention is embodied in apparatus for addressing an image memory storing a compacted graphic image which apparatus, owing to its operating purely in display memory spatial coordinates and not in temporal coordinates, works, no matter what order locations in the image memory are addressed by phantom raster coordinates. In regions of the image space described in converted-scan coordinates and scanned by the phantom raster, phantom raster coordinates are selectively modified by linearly combining them with offset terms according to regions in that image space. These modifications selectively translate the phantom-raster scan coordinate system to parallel the telescoped image space coordinates, in those portions of the regions in which compacted graphic images are stored in image memory. The reading of the image memory responsive to phantom raster scan is then enabled only during those portions of these regions.

In the drawing:

FIGS. 7, 8 and 9 are tables describing operation of certain embodiments of the invention.

Figure 1:
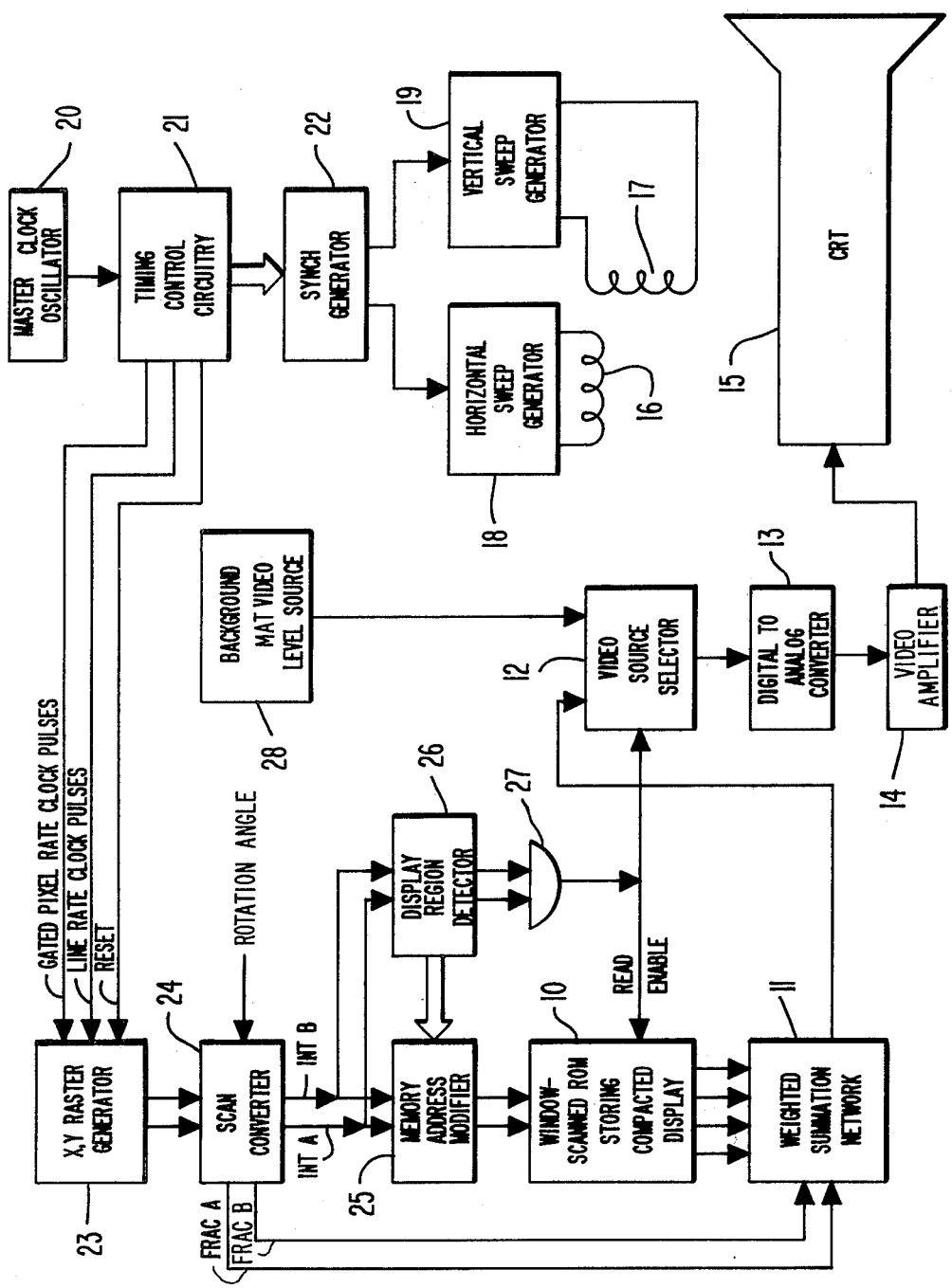
FIG. 1 is a block diagram of a graphic display system of the sort embodying the invention.

In the FIG. 1 graphic display system a read only memory (ROM) 10 stores compacted image information in storage locations addressable by column and by row. ROM 10 is arranged to respond to each column and row address supplied to it to provide parallel access to four spatially adjacent locations, the first of these locations having the specified column and row addresses, the second of these locations having a column address next to the specified column address and having the specified row address, the third of these locations having the specified column address and a row address next to the specified row address, and the fourth of these locations sharing the next column and row addresses with the second and third locations respectively. These four spatially adjacent storage locations are those which surround the point in image space actually specified by phantom raster scan. They provide the data from which to obtain a weighted average that can be used to represent the graphic image at the actually specified point, so as to minimize apparent quantizing errors in the displayed graphic image. This parallel accessing to four spatially adjacent locations can be carried out by multiplexing four component memories as described in detail in U.S. patent application Ser. No. 298268 filed Aug. 31, 1981 and entitled "WINDOW-SCANNED MEMORY"—or may be simulated by arranging for the serial addressing of the four locations and temporarily storing the read outs in buffer registers, from which registers the read outs from the four storage locations may be subsequently taken in parallel.

The four streams of parallel output data from memory 10 are supplied to a weighted summation network 11, which weights each set of four image samples according to fractional scan coordinate input data and sums them to provide digital video samples. These samples are selectively applied via video source selector switch 12 as input to a digital-to-analog converter (DAC) 13. DAC 13 responds with analog video output, which is applied to the input of a video amplifier 14; and the amplified analog video controls the electron beam current of a cathode ray tube (CRT) 15 to vary the intensity of light on a display screen. The electron beam is deflected by the electromagnetic fields engendered in horizontal and vertical sweep coils 16 and 17 by horizontal and vertical sweep generators 18 and 19, respectively, to provide raster scanning of the display screen.

A master clock oscillator 20 provides the basic frequency standard for timing control circuitry 21, which times the generation of synchronizing pulses by synch generator 22 for synchronizing the sweep generators 18 and 19. Timing control circuitry 21 also provides gated pixel rate clock pulses, line rate clock pulses during line retrace interval, and reset pulses during field retrace interval, which signals are supplied to a raster generator 23. Raster generator 23 generates a raster in sampled-data form according to x and y Cartesian coordinates. The two parallel streams of x and y coordinates describing display raster scan are supplied to scan converter 24 to be transformed to a phantom raster in a, b coordinates, where a and b are general coordinates.

These general coordinates may be u, v Cartesian coordinates rotated respective to x, y Cartesian coordinates, or may be r, $\theta$ polar coordinates, for example. In any case, these a, b coordinates describe the image space in the coordinates the display would be stored in ROM 10, were the image not compacted. While the x and y coordinates describing raster scan are integral numbers, they transform to a and b coordinates that tend to be non-integral. The integral and fractional portions of the a-direction coordinates are denominated int a and frac a, respectively; and the integral and fractional portions of the b-direction coordinates are denominated int b and frac b, respectively. The column and row partial addresses for memory 10 are derived from int a and int b, respectively, and frac a and frac b are used to govern the weighting of samples in weighted summation network 11.

The primary concern of the invention concerns the addressing and selective read-enabling of image memory 10 to extract the compacted image stored therein. While int a and int b may be applied without modification to memory 10 as column and row partial addresses respectively in selected portions of a, b image space, more generally they will be modified by linear combination with respective offsets in a memory address modifier 25. The actuation of such partial address modifications is controlled responsive to display region detector circuitry 26. Detector circuitry 26 analyzes int a and int b to determine at any given video sample interval the region of a, b image space the point the phantom raster scan output from scan converter 24 is located in. If and only if int a falls in a range descriptive of one of the regions of image space that graphic image taken from memory 10 appears in, detector 26 forwards a ONE to a first input of an AND gate 27; and, if and only if int b falls in a range descriptive of one of the regions of image space that graphic image taken from memory 10 appears in, detector 26 forwards a ONE to a second input of AND gate 27. AND gate 27 output is ONE, then, only in regions of image space in which graphic image taken from memory 10 appears. This ONE is supplied as a READ ENABLE signal to memory 10 and as control signal to video source selector 12 to direct the application of weighted summation network 11 output signal to the input circuit of DAC 13. The absence of READ ENABLE signal directs source selector 12 alternatively to apply background mat video level, from source 28 thereof, to the input circuit of DAC 13.

Which one of the regions of a, b image space stored in memory 10 is to be addressed is also determined by detector circuitry 26. This information is forwarded to memory address modifier 25 to govern the selection of the offset terms to be linearly combined with int a and int b to form column and row partial addresses for memory 10. In certain special cases, as will be described later on, the detector 26 and address modifier 25 may be merged together. The AND function of gate 27 may be subsumed in detector 26 as well.

Figure 2:
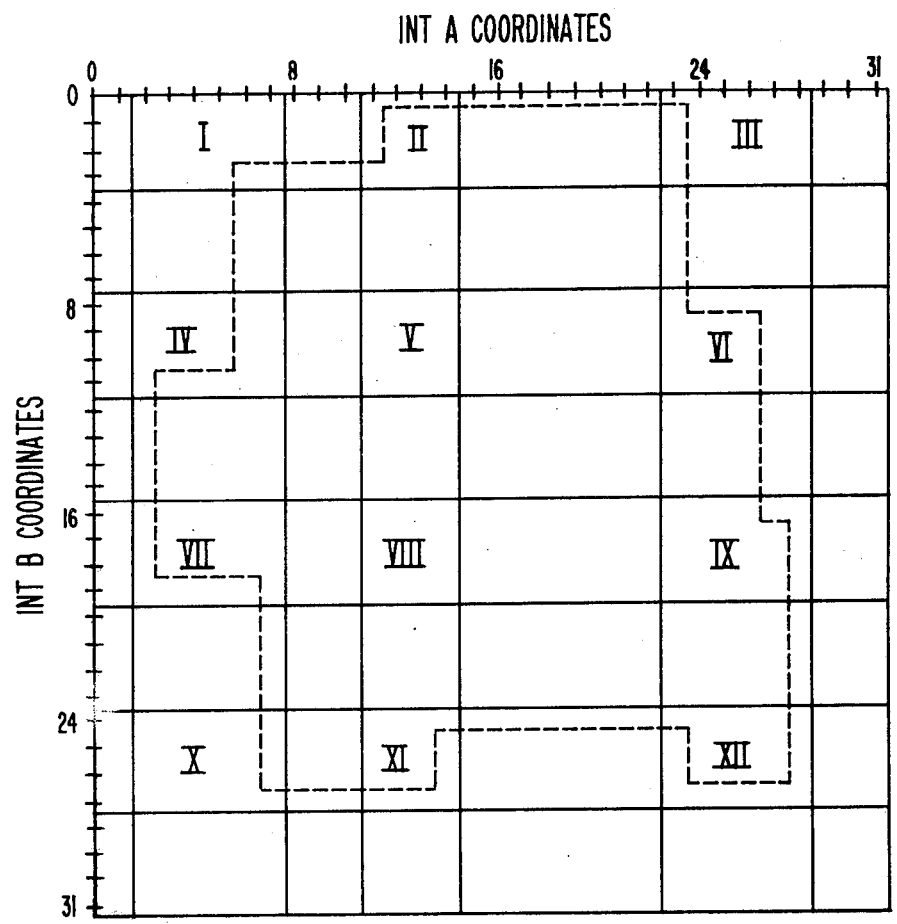
FIG. 2 is a map of an image space, regions of which bearing Roman numerals are occupied by graphic elements to be stored in compacted format in an image memory.

FIG. 2 shows a representative a, b image space divided into rectangular regions. Those regions bearing Roman numerals have graphic image content in them which is stored in ROM 10. For reducing the complexity of the apparatus being described and thus aid the reader's comprehension of the invention disclosure, the space is shown divided into $2^5$ by $2^5$ portions; in practice an image space will probably be divided into $2^8$ by $2^8$, $2^9$ by $2^9$, or $2^{10}$ by $2^{10}$ portions if the entire display raster scan is mapped into it. A technique will now be described for designing the addressing of the ROM storing the FIG. 2 display compacted to omit the regions without Roman numerals, such that the FIG. 2 display can be recreated with all its regions.

Consider first the generation of ROM 10 column addresses from int a coordinates of phantom raster scan. The generation of a table such as that of FIG. 7 is helpful in the design procedure. The $2^5$ possible a-direction phantom raster coordinates are listed in the first, leftmost column of the table. The compacted image can be stored in a display memory with only $2^4$ columns, and the $2^4$ available column addresses are listed in the third column from left of the table opposite the a-direction phantom raster coordinates to which they should correspond. The offsets that must be linearly combined with each phantom raster coordinate in leftmost column of TABLE I to provide a result, the last four bits of which correspond to the partial address of ROM 10, can be computed from the entries in the first and third columns from left of FIG. 7 table, then entered in the second column from left of the table. In FIG. 7 table the linear combination of phantom raster coordinate and offset is presumed to be carried forward in a four-bit adder discarding the carries. The offset entry will differ if the linear combination algorithm is different—e.g., subtraction. The fourth column from left of FIG. 7 table has ONE's entered in the lines where the phantom raster coordinate describes a coordinate in image space that may be the partial address of a region in that space concerning which information is stored in memory 10.

The two rightmost columns in FIG. 7 table describe the boundary conditions on the a-direction coordinates of the regions of a, b image space. The description is in a format useful for designing networks with digital comparators supplying a ONE output if a first input equals or exceeds a second input, and supplying a ZERO output if the first input is less than the second input. If a different type of digital comparator is to be used in the display region detector—e.g., one supplying a ONE only if a first input exceeds a second input and supplying a ZERO if the first input equals or is less than the second input—the tabulation can be suitably modified.

Figure 3:
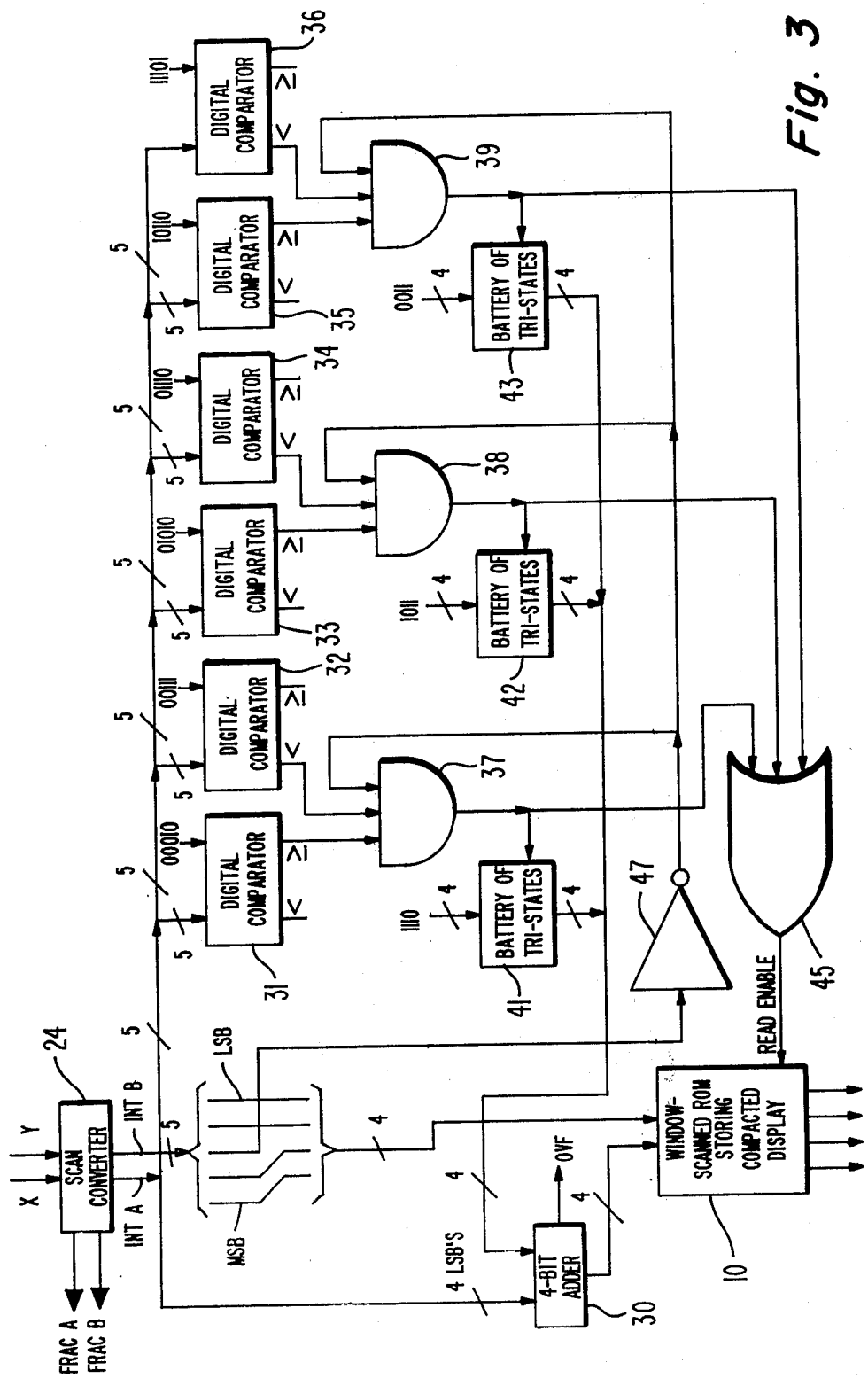
FIG. 3 is a block diagram showing more particularly the display region detector and memory address modifying circuitry for addressing, in accordance with the invention, the compacted image space comprising the regions of the FIG. 2 image space bearing Roman numerals.

Referring to FIG. 3, the display region detector circuitry and memory address modifier circuitry for realizing operation according to FIG. 7 table are shown. A four-bit adder 30 receives the four least significant bits of the five-bit binary number int a as a first input to be linearly combined with a second input for developing the column addressing for ROM 10. Digital comparators 31, 32, 33, 34, 35, and 36 receive all their respective first inputs the int a output signal supplied by scan converter 24 for comparison with limit values 00010, 00111, 01010, 01110, 10110, and 11101, respectively, as applied to their respective second inputs. The int $a \geq 00010$ output of comparator 31 and the int $a < 00111$ output of comparator 32 are applied as inputs to an AND gate 37, which can respond with a ONE output only when int a is in the range used as a-direction coordinate for regions I, IV, VII, and X of the non-compacted a, b image space of FIG. 2. This ONE conditions a battery 41 of tri-states to forward the binary number 1110 as input to adder 30, at low impedance, rather than high, so int a (with its most significant bit suppressed) is augmented by 1110 (with any overflow or carry bit discarded) to develop the appropriate column address for ROM 10 in regions I, IV, VII, and X. The int $a \geq 01010$ output of comparator 33 and the int $a < 01110$ output of comparator 34 are applied as inputs to an AND gate 38, which can respond with a ONE output only when int a is in the range used as a-direction coordinate for regions II, V, VIII, and XI of the noncompacted a, b image space of FIG. 2. This ONE conditions a battery 42 of tri-states to forward the binary number 1011 as input to adder 30 at low-impedance, rather than high, so int a (with its most significant bit suppressed) is augmented by 1011 (with any overflow or carry bit discarded) to develop the appropriate column address for ROM 10 in regions II, V, VIII, and XI. And the int $a \geq 10110$ output of comparator 35 and the int $a < 11101$ output of comparator 36 are applied as inputs to an AND gate 39, which can respond with a ONE output only when int a is in the range used as a-direction coordinate for regions III, VI, IX, and XII of the non-compacted a, b image space of FIG. 2. The ONE applied via OR gate 44 conditions battery 43 of tri-states to forward the binary number 0011 as input to adder 30 at low-impedance, rather than high, so int a (with its most significant bit suppressed) is augmented by 0011 (with any overflow or carry bit discarded to develop the appropriate column address for ROM 10 in regions III, VI, IX, and XII.

The outputs of AND gates 37, 38, and 39 are applied as inputs to an OR gate 45, the output of which can go to ONE when int a coordinate is in a range that could specify one of the regions in FIG. 2 a, b image space stored in ROM 10, but otherwise must be ZERO. The AND gates 37, 38, and 39 together perform the AND function of gate 27 in FIG. 1. The ONE output of OR gate 45 is applied as READ ENABLE signal to ROM 10. The skilled digital circuit designer will, of course, note that the logic in the comparator and AND gate circuitry 31–39 be reduced to a more compact logic network, for directly decoding the bands of phantom raster coordinates where the output impedances of batteries 41, 42, 43 of tri-states are rendered low.

FIG. 8 is a table descriptive of operating conditions with respect to b-direction coordinates can be set up similar to the FIG. 7 table descriptive of operating conditions with respect to a-direction coordinates. If one examines the band structure of the b-direction coordinates of regions in the a, b image space depicted in FIG. 2, one will note that width and spacing of these regions are expressable in powers of two. Under such special conditions the digital comparison and address modification functions can be carried forward by bit manipulation alone or by bit manipulation coupled with some simple logic, to save a considerable amount of digital hardware. Careful examination of the FIG. 8 table reveals that the bit forwarded to AND gate 27 for generating READ ENABLE is ONE when the logic-complement of the third bit of phantom raster b-direction coordinate is ONE; and logic inverter 47 in FIG. 3 inverts this bit in int b to supply each of AND gates 37, 38, and 39 input indicative of when int b is in a range where that AND gate is to supply a ONE output to OR gate 45, so gate 45 will in turn supply a ONE output as READ ENABLE to ROM 10. Careful examination of the FIG. 8 table also reveals that the first, second, third, and fourth bits of memory row address can be supplied directly using the first, second, fourth, and fifth bits of int b, respectively, as shown also in FIG. 3.

Especial note is to be taken of the way data is to be handled in the FIG. 1 system at the edges of the regions in FIG. 2 a, b image space that bear Roman numerals. Supposing the graphic images in these regions not to flow into each other, a line of background mat must be stored in ROM 10 at the edge of at least one of each pair of such regions opposed to each other across a discontinuity, this being done to furnish data to the weighted summation network 11 that the network needs in the interpolation-like process which defines edges without unwanted rastering effects.

Furthermore it is significant that, unlike the case where compacted memory is scanned using partial addresses supplied from intermittently advanced counters, ROM 10 does not continue to furnish the data appearing at the last address applied to it while the phantom raster crosses spatial intervals for which no image information is stored. It is for this reason that a video source selector switch 12 and background mat video level source 27 are used in FIG. 1, to provide the information required to maintain the display during the crossing of these spatial intervals. Source 27 may be viewed as an alternate memory which stores the replicated data for all points in the regions of FIG. 2 space which do not bear Roman numerals.

The projection of a continuous graphic image through the regions where data is omitted in ROM 10 is possible in other embodiments of the invention, however. Suppose, for example, the dashed line in FIG. 2 passing through regions I, II, III, VI, IX, XII, XI, X, VII, and IV back to region I encloses an area of different video level than background mat. It is necessary to project the boundary between this area and background mat through regions between regions I and II, II and III, III and VI, VI and IX, IX and XII, XII and XI, XI and X, X and VII, VII and IV, and IV and I, respectively. By way of illustration, the projection of the boundary through the region between regions I and II can be accomplished by continually modifying the int a address supplied memory 10 in this intermediate region so it equals the rightmost int a address in region I—i.e., 7 in decimal notation, or 00111 in binary notation.

Figure 4:
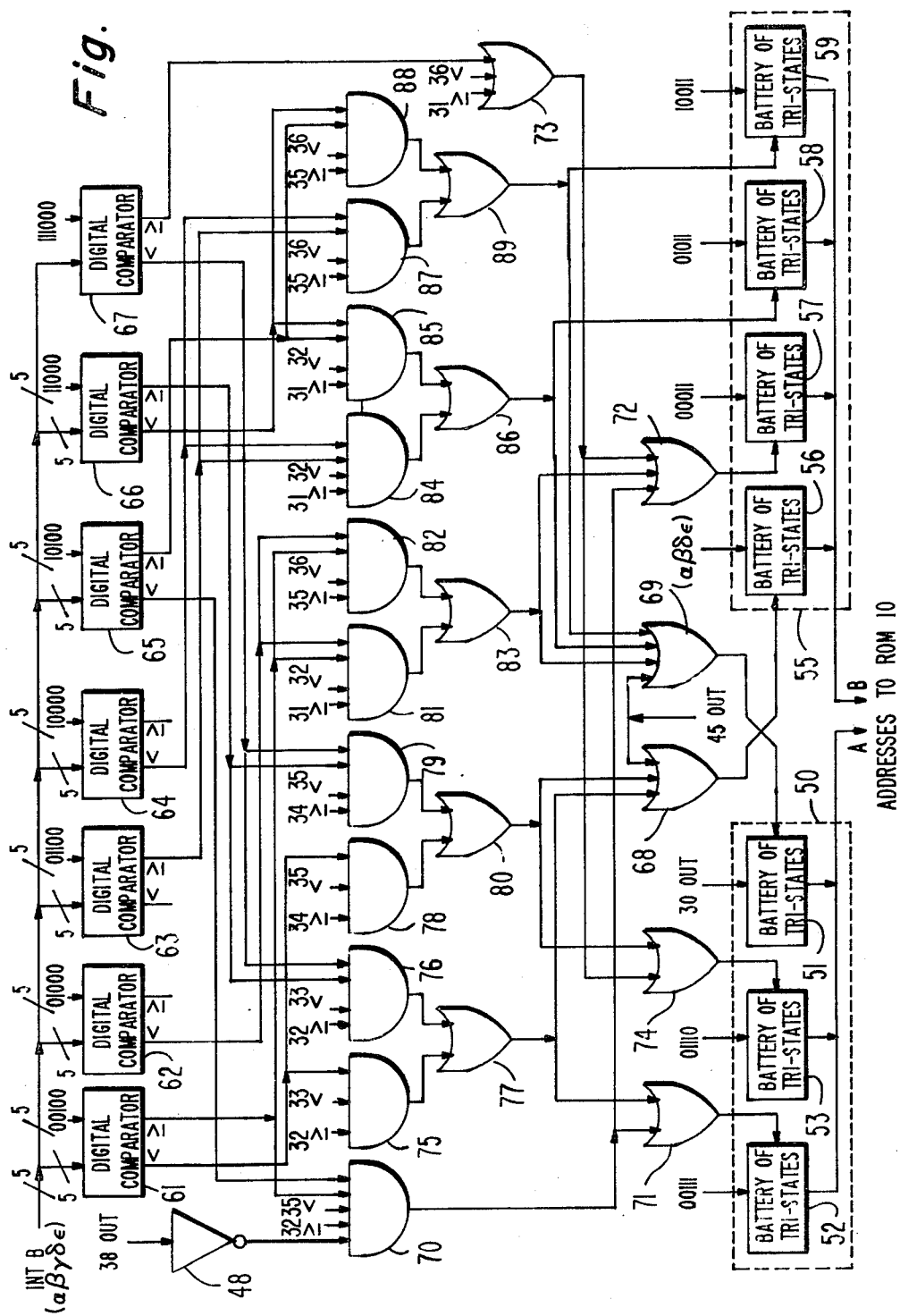
FIG. 4 is a block diagram of modifications that can be made in the FIG. 1 graphic display system which allow graphic images to be projected through regions of image space with minimal image memory requirement, in accordance with a further aspect of the invention.

FIG. 4 shows the circuitry for addressing the window-scanned ROM 10 so that the area within the dashed lines in FIG. 2 can be maintained despite compaction of the graphic image information in ROM 10 to only describe the regions bearing Roman numerals. Where the FIG. 4 circuitry is used, ROM 10 is continuously supplied READ ENABLE signal; and the digital video output of weighted summation network 11 is applied directly to the input of DAC 13, with video source selector 12 and background mat video level source 27 both being dispensed with. The int a addresses for ROM 10 are supplied it through a multiplexor (MUX) 50 shown as comprising batteries 51, 52, and 53 of tri-states; and the int b addresses are supplied through a multiplexor 55 shown as comprising batteries 56, 57, 58, and 59 of tri-states.

MUX 50 selects the output of 4-bit adder 30 as ROM 10 int a address when the portions of the graphic image in the Roman numeral regions are being read out, this selection being carried forward by tri-states in battery 51 being conditioned to be in their low-impedance output states while tri-states in batteries 52 and 53 are not conditioned to be in their low-impedance states. Mux 50 also selects the output of 4-bit adder 30 as ROM 10 int a address in the regions between regions I and IV, between regions III and VI, between regions IV and VII, between regions VI and IX, between regions VII and X, and between regions IX and XII. Between regions I and II, between regions X and XI, and in regions which are completely background mat MUX 50 selects 00111 as ROM 10 int a address, this selection being carried forward by tri-states in battery 52 being conditioned to be in their low-impedance output states while those in batteries 51 and 53 are not. Between regions II and III, between regions XI and XII, and in regions entirely within the dashed line which do not bear Roman numerals, MUX 50 selects 01110 as ROM 10 int a address, this selection being carried forward by tri-states in battery 53 being conditioned to be in their low impedance states while those in batteries 51 and 52 are not.

MUX 55 selects the $\alpha\beta\delta\epsilon$ bits of the int b=$\alpha\beta\gamma\delta\epsilon$ output of scan converter 24 as ROM 10 int b address when the portions of the graphic image in the Roman numeral region are being read out, this selection being carried forward by the outputs of tri-states in battery 56 being conditioned to be in their low-impedance state, while those in batteries 57, 58, and 59 are not. This selection of $\alpha\beta\delta\epsilon$ as ROM 10 int b address is also made in the regions between regions I and II, II and III, X and XI, and XI and XII. MUX 55 selects 00011 as ROM 10 int b address in the regions between I and IV, in the regions between III and VI, in the regions which are entirely background mat, and in the regions within the dashed line which do not bear Roman numerals. MUX 55 selects 01011 as ROM 10 int b address between regions IV and VII and between regions VI and IX, and it selects 10011 as ROM 10 int b address between regions VII and X and between regions IX and XII.

The generation of control signals for conditioning tri-states in batteries 51, 52, 53, 56, 57, 58, and 59 uses the outputs of digital comparators 31, 32, 33, 34, 35, and 36 to supply the information needed to determine which of the vertical bands of FIG. 2 image space int a is in. Analogously, a set of digital comparators 61, 62, 63, 64, 65, 66, and 67 compares int b supplied from scan converter 24 to 00100, 01000, 01100, 10000, 10100, 11000, and 11100 respectively to generate information needed to determine which of the horizontal bands of FIG. 2 image space int b is in. The logic comprising OR gate 45 and AND gates 37, 38, and 39 is still used to determine whether or not int a and int b addresses describe a point within one of the regions of FIG. 2 image space bearing a Roman numeral. The output of OR gate 45 is applied as inputs to OR gates 68 and 69, which respond to these inputs being a ONE, indicating that the point is within one of those regions, to supply respective output ONE's. The output signals of OR gates 68 and 69 are applied as control signals to batteries 56 and 51, respectively, of tri-states. The output signal of OR gate 69 being ONE conditions the output states of tri-states in battery 51 to be low-impedance, so the output of 4-bit adder 30 is forwarded to ROM 10 as its int a address. The output signal of OR gate 68 being ONE conditions the output states of tri-states in battery 56 to be low-impedance, so the $\alpha\beta\delta\epsilon$ bits of int b having bit pattern $\alpha\beta\gamma\delta\epsilon$ are forwarded to ROM 10 as its int b address.

An AND gate 70 is to supply a ONE output whenever the int a, int b address supplied by scan converter 24 lies in a region of FIG. 2 image space wholly within the dashed line exclusive of regions V and VIII. The exclusion of regions V and VIII from causing AND gate 70 output to go to ONE is arranged for by inverting the output response of AND gate 38 in logic inverter 48 and applying the resulting output signal of inverter 48 as one of the input signals to AND gate 70. The outputs of comparators 32 and 35 indicating int a to be greater than or equal to seven and to be less than twenty-two, respectively, provide further inputs to AND gate 70. The remaining inputs to AND gate 70 are outputs of comparators 61 and 65 indicating int b to be greater than or equal to four and to be less than twenty-four, respectively. ONE output from AND gate 70 is applied as input to OR gates 71 and 72 causing their outputs both to go to ONE. The ONE output of OR gate 71 conditions the outputs of the tri-states in battery 52 to be low-impedance, forcing int a address for ROM 10 to be 00111; and the ONE output of OR gate 72 conditions the outputs of tri-states in battery 57 to be low-impedance, forcing int b address for ROM 10 to be 00011. The point int a=7, int b=3 in FIG. 2 image space is within the area enclosed by dashed line, so the forced address applied to ROM 10 causes read-out of appropriate video from this storage location.

An OR gate 73 is to supply a ONE output whenever the int a, int b address supplied by scan converter 24 lies in a region of FIG. 2 image space entirely outside the dashed line, where background mat video level is to be read-out from ROM 10. Accordingly OR gate 73 receives as inputs the output from comparator 31 indicating int a is smaller than two, the output from comparator 36 indicating int a is equal to or larger than twenty-nine, and the output from comparator 67 indicating int b is equal to or larger than twenty-eight. ONE output from OR gate 73 is applied as input to OR gate 74, causing its output to go to ONE to condition the outputs of tri-states in battery 53 to be low-impedance forcing an int a address of 01110 to be supplied ROM 10. ONE output from OR gate 73 is also applied as input to OR gate 72, causing its output to go to ONE to condition the outputs of tri-states in battery 57 to be low-impedance forcing an int b address of 00011 to be supplied ROM 10. The point int a=14, int b=3 in FIG. 2 image space is outside the area enclosed by dashed line, so the forced address applied to ROM 10 causes read out of appropriate video from this storage location.

The choice of storage locations in ROM 10 to address for regions not specifically described in the memory is arbitrary, so long as they contain appropriate video level information. Consider now the generation of appropriate video for regions of FIG. 2 image space not specifically described by data stored in ROM 10 which regions are split between background mat and a portion of the area enclosed within dashed line. An AND gate 75 receives inputs from comparators 32, 33, and 61 to provide a ONE output when and only when the address supplied by scan converter 24 falls in the region between regions I and II of FIG. 2 image space. Another AND gate 76 receives inputs from comparator 32, 33, 66, and 67 to provide a ONE output when and only when the address supplied by scan converter 24 falls in the region between regions X and XI. In either case, an OR gate 77 receptive of the outputs of AND gates 75 and 76 supplies an output ONE to OR gates 71 and 68. OR gate 71 output goes to ONE, conditioning the outputs of tri-states in battery 52 to be low-impedance, forcing int a=3 address to ROM 10. OR gate 68 output goes to ONE, conditioning the outputs of tri-states in battery 56 to be low-impedance, so that $\alpha\beta\delta\epsilon$ is forwarded to ROM 10 as its int b address. Accordingly, the leftmost edge of region I is projected across to the rightmost edge of region II in the region between them; and the leftmost edge of region X is projected to the rightmost edge of region XI in the region between them.

Analogously, AND gates 78 and 79 and an OR gate 80 provide for projection of the graphic image through regions between regions II and III and between regions XI and XII, a ONE output from OR gate 80 in these intermediate regions causing ONE outputs from OR gates 74 and 68 which condition batteries 53 and 55 of tri-states to apply 01110 and $\alpha\beta\delta\epsilon$ to ROM 10 as its int a and int b addresses. AND gates 81 and 82 and OR gate 83 provide for projection of the graphic image through region between regions I and IV and between regions III and VI, a ONE output from OR gate 83 in these intermediate regions causing ONE outputs from OR gates 69 and 72 which condition batteries 51 and 57 of tri-states to apply the output of adder 30 and 00011 to ROM 10 as its int a and int b addresses. AND gates 84 and 85 and OR gate 86 provide for projection of the graphic image through regions between regions IV and VII and between regions VI and IX, a ONE output from OR gate 86 in these intermediate regions, causing ONE output from OR gate 69 to condition the battery 51 of tri-states to apply the output of adder 30 to ROM 10 as its int a address, and also conditioning the battery 58 of tri-states to apply 01011 to ROM 10 as its int b address. AND gates 87 and 88 and OR gate 89 provide for projection of the graphic image through the region between regions VII and X and through the region between regions IX and XII, a ONE output from OR gate 89 in these intermediate regions causing a ONE output from OR gate 69 to condition the battery 51 of tri-states to apply the output of adder 30 to ROM 10 as its int a address, and also conditioning the battery 59 of tri-states to apply 10011 to ROM 10 as its int b address.

Digital comparators 61–67 can be simplified to simply compare the three most significant bits $\alpha\beta\gamma$ of int b output of scan converter 24 to the three most significant bits of 00100, 01000, 01100, 10000, 10100, 11000, and 111000. These comparators and gates 70–89 can be replaced with more compact logic arrays, using standard reduction techniques, the more complex logic network being shown to preserve a better feeling for the design objectives the system is to meet.

Returning to more general aspects of the addressing of compacted memory, the simplicity of compacted memory b-coordinate addressing using bit manipulation, as done for the special case of operation set forth in the table of FIG. 9, offers incentive for exploration of the extent to which special cases of operation can be exploited in compacted memory addressing. The table of FIG. 9, like that of FIG. 8, lists the phantom raster coordinates and corresponding display memory coordinates as binary numbers. These numbers have the bit patterns $\alpha\beta\gamma\delta\epsilon$ and $\alpha\beta\delta\epsilon$, respectively. The leftmost column (1) of bit forward of the memory read enable pattern listings shows a pattern of bit forward to AND gate 27 for generating READ ENABLE signal similar to that of the FIG. 8 table, wherein the bit forward is provided by $\gamma$. The display memory coordinates developed from phantom raster coordinates for which READ ENABLE signal is withheld according to this pattern are also listed rather than a DON'T CARE condition in the FIG. 9 table.

The FIG. 9 table lists other patterns of bit forward to generate READ ENABLE signal which select sixteen different ones of the thirty-two duplicate display memory coordinates as valid partial addresses for the image memory. Pattern 2 bit forward is provided by $[(\delta+\epsilon)\cdot\overline{\gamma}]+[\overline{\delta+\epsilon)}\cdot\gamma]$ and shifts the compacted graphic image stored in ROM 10 in the b-direction as would be reconstructed in non-compacted form in a, b image space. Pattern 3 bit forward is provided by $(\delta\cdot\overline{\gamma})+(\overline{\delta}\cdot\gamma)$ and causes further b-direction shift of the graphic image. Pattern 4 bit forward is provided by $\gamma$, causing still further b-direction shift of all elements of the graphic image. Patterns 1-4 of bit forward all compact the graphic image similarly, but displace it differently in a, b image space. This displacement could be achieved alternatively, simply by translating the phantom raster coordinates vis-a-vis display raster.

The sets of bit forward patterns represented by patterns 5, 6, 7 generate useful results difficult to achieve otherwise. Pattern 5 bit forward provided by $(\gamma\cdot\overline{\beta})+(\overline{\gamma}\cdot\beta)$ rearranges the four discontinuous ranges of valid display memory partial address to form two discontinuous ranges with greater displacement between ranges. Pattern 6 bit forward is provided by $\overline{\alpha}\cdot\overline{\beta}\cdot\gamma+\alpha\cdot\beta\cdot\overline{\gamma}\cdot\overline{\delta}+\overline{\alpha}\cdot\beta\cdot\gamma\cdot\delta+\alpha\cdot\overline{\beta}\cdot\overline{\gamma}+\alpha\cdot\beta\cdot\overline{\gamma}\cdot\delta+\alpha\cdot\beta\cdot\gamma\cdot\overline{\delta}$ rearranges the four discontinuous ranges of valid display memory partial address to form three discontinuous ranges. Pattern 7 bit forward and pattern 8 bit forward retain four discontinuous ranges of valid display memory (looping 1111 to 0000 in case of pattern 8) but change their respective sizes and spacings. (The logic functions needed for generating some READ ENABLE signals tend towards sufficient complexity that the generation of these signals using digital comparators as was done with the a-coordinate handling portion of the FIG. 3 apparatus becomes advisable.)

So, then, for given bit manipulation of phantom raster coordinate, one may develop a variety of compacted coordinate range structures by changing the logic for developing the memory READ ENABLE from phantom raster scan coordinate. This is one of the basic permutations to be considered in seeking simplified hardware for addressing compacted display ROM.

Another basic permutation to be considered is the way in which the multiple-bit binary number used to address compacted display ROM is developed by bit manipulation from the binary number with greater number of bits furnished as phantom raster scan coordinate. This affects the order in which the replicate memory addresses appear and may facilitate shifting of regions of valid memory addresses together to form larger regions, using altered bit forward patterns.

Figure 5:
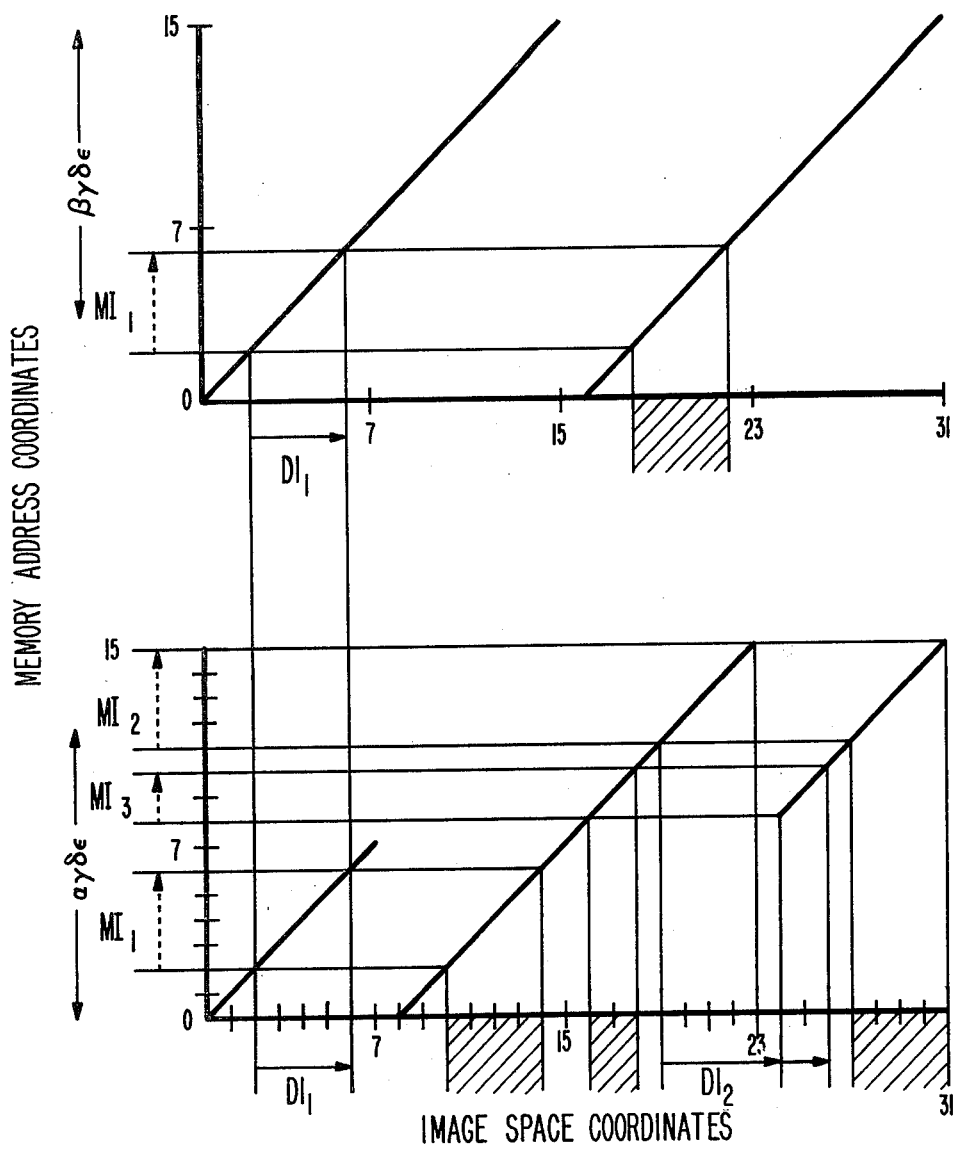
FIG. 5 are two graphs of memory address coordinates plotted against a common axis of phantom raster scan coordinates, useful in explaining the compaction of data in image memory.

Graphs of memory address coordinates versus phantom raster scan coordinates of the sort shown in FIG. 5 are a useful tool to visualize these relationships. The phantom raster scan coordinates are binary numbers of the form $\alpha\beta\gamma\delta\epsilon$. In the top graph the memory address coordinates are obtained from $\alpha\beta\gamma\delta\epsilon$ by suppressing $\alpha$; and in the bottom graph, by suppressing $\beta$. In each case the memory address coordinates are duplicated in the range of phantom raster scan coordinates. Suppose it is desired to store in compacted display memories both a display image $DI_1$ lying between $\alpha\beta\gamma\delta\epsilon$ coordinates 2 and 6 and display image $DI_2$ lying between $\alpha\beta\gamma\delta\epsilon$ coordinates 19 and 26. Projecting $DI_1$ into the memories as $MI_1$, memory image $MI_1$ is stored between coordinates 2 and 6 in the upper compacted display memory and between $\alpha\gamma\delta\epsilon$ coordinates 2 and 6 in the lower compacted display memory, usurping these coordinate ranges in the addresses of each memory. When the upper memory is addressed, stored image $MI_1$ tends to be retrieved for phantom raster address coordinates in both 2-6 and 18-22 ranges, and there must be withholding of READ ENABLE signal in the 18-22 range (as indicated by a striped zone) to properly locate $DI_1$ in the display. There is, then, no possibility of storing display image $DI_2$ in the upper compacted memory since a portion falls in the striped zone where reading of the memory has to be prevented.

If the lower compacted memory is addressed, on the other hand, stored image $MI_1$ tends to be retrieved for phantom raster address coordinates in both 2-6 and 10-14 ranges, and there must be withholding of READ ENABLE signal in the latter range, shown as a striped zone where no other display image may be placed. Respective portions of the display image $DI_2$ project as stored images $MI_2$ and $MI_3$ in a different set of memory locations than display image $DI_1$, tending to be retrieved when phantom raster coordinates are in the 19-26 range or in the 27-31 and 16-18 ranges. To properly locate $DI_2$, READ ENABLE signal is supplied in the 19-26 range and withheld in the other ranges.

If the number of available storage locations in display memory somewhat exceeds the number of storage locations needed to store the graphic image in most highly compacted form (as will usually be the practical outcome when the most highly compacted form is not of integral-power-of-two by integral-power-of-two dimensions), fewer of the manipulations of READ ENABLE signal decoding and of bit position in abbreviated ROM addressing result in two portions of the graphic image undesirably having to be stored at the same location in display memory. It also becomes easier to divide the graphic image amongst similar-size rectangular regions that are integral powers of two on side with regard to both column and row addresses. This not only facilitates manipulation of READ ENABLE signal generation to shift or interchange bands of image space as they appear in final display; it also facilitates another image manipulating technique, now to be described.

So far in this specification the shifting of graphic image information in the final display has involved translating all the graphic image information in one of the a-coordinate and b-coordinate bands by like amount on the display screen, by changing the pattern of READ ENABLE signal for the address coordinate along the direction of translation. It is sometimes desirable, however, to translate the appearance on display screen of only one or a selected number of those regions in a band. This can be done by selectively changing the pattern of READ ENABLE signal for the address coordinate along the direction of translation, responsive to the address coordinate to which the direction of translation is normal.

Figure 6:
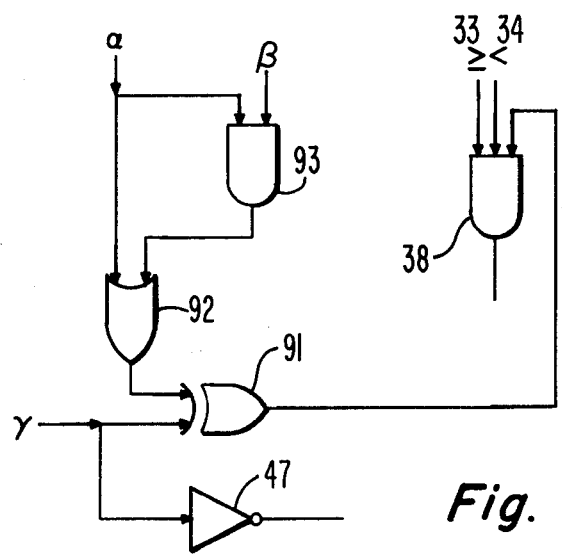
FIG. 6 is a block diagram showing a modification of the FIG. 3 circuitry in accordance with a further aspect of the invention.

FIG. 6 shows circuitry for interchanging region V in FIG. 2 image space with the region below it, for example. If one fills in the DON'T CARE condition in the FIG. 8 table for phantom raster int b coordinates 01100, 10010, 01110, 01111, one obtains the same memory coordinates as for phantom raster int b coordinates 01000, 01001, 01010, 01011 presuming that the memory coordinates are generated by omitting the $\gamma$ digit of phantom raster coordinates with $\alpha\beta\gamma\delta\epsilon$ bit pattern. So, selectively inverting the response of AND gate 38 in the region where the $\alpha$ and $\beta$ bits of int b respectively equal ZERO and ONE, will interchange READ ENABLE from region V to the region below it in FIG. 2 image space. This can be done by disconnecting the input of AND gate 38 from its FIG. 3 connection to logic inverter 47 output and connecting it to the output of an exclusive-OR gate 91, which receives the γ bit of the int b output scan converter 24 at one of its inputs. The other output of XOR gate 91 is from the output of OR gate 92, so AND gate 38 receives γ responsive to OR gate 92 output being ZERO and γ responsive to OR gate 92 output being ONE. OR gate 92 output is ONE responsive to α bit of scan converter 24 int b output being ONE or responsive to a NAND gate 93 output being ONE. NAND gate 93 output is ONE only when the α and β bits of scan converter int b output are both ZERO.

The FIG. 6 circuitry carries out one of the simpler sorts of selective translating of regions of the graphic image in the final display. Considerably more complex schemes can be carried forward, using the principle of responding to both partial addresses supplied by scan converter 24 to govern the offsets to be added to them in each region of the display. One may also arrange to change the band structure in one coordinate depending on the band structure in the other coordinate, either independently of or in conjunction with the selective region shifting in image space band.

Thusfar this specification describes compacted memory systems which avoid plural addressing of display memory except when an image is to be projected through a region in image space. However, certain graphic images contain repetitive forms which can be stored just once in memory, but made to appear in replicated form on the screen by the plural addressing of the compacted display memory. These schemes can be carried out by simply omitting bits from the partial addresses generated by the scan converter 24 to develop the addresses applied to display ROM 10, by manipulating the offsets added to scan converter 24 output to address the same portions of display memory in different regions of space, or by using either of the previous techniques together with selective translation or rotation in the scan conversion. These plural addressing techniques work particularly well with the present invention, where addressing of display memory is carried out on a purely spatial coordinate basis, since there are no limitations on the direction or sequence of scan through the display memory.

The scope of the claims which follow is to be construed so as not to change if the word "row" be replaced by "column" and vice versa.

What is claimed is:

1. Apparatus for generating a video signal descriptive of an area in a raster-scanned display, said apparatus comprising:
   means for recurrently generating first and second series of digital electric signals respectively specifying in numeric form first and second orthogonal coordinates of phantom raster scan through said display area, there being a number m of signals in said first series and a number n of signals in said second series, where m and n may be equal or unequal integers;
   a display memory having a plurality of storage locations each accessable in response to a unique pair of column and row addresses for read-out of a video sample concerning a point in one of selected regions of said display area for which graphic information is stored in the display memory in compacted form, there being a number p of column addresses and a number q of row addresses, where p and q may be equal or unequal integers, where p is no larger than m and q is no larger than n, and where one of the numbers p and q is smaller than the number it is specified as being no larger than;
   means responsive to digital electric signals in said first series for generating purely in spatial coordinate terms corresponding column addresses for p selected ones of those digital electric signals;
   means responsive to digital electric signals in said second series for generating purely in spatial coordinate terms corresponding row addresses for q selected ones of those digital electric signals;
   means responsive to digital electric signals other than the p selected ones of said first series and q selected ones of said second series for supplying a source of video samples alternate to that provided by read-out of said display memory responsive to its being simultaneously addressed by column address generated responsive to a corresponding one of said p selected digital electronic signals of said first series and by column address generated responsive to a corresponding one of said q selected digital electric signals of said second series; and
   means responding to video samples read-out from said display memory in response to its said being simultaneously addressed, and to video samples supplied by said alternate source to provide said video signal.

2. Apparatus for generating a video signal as set forth in claim 1 wherein p is smaller than m and wherein said means responsive to digital electric signals in said first series for generating corresponding column addresses includes:
   means for supplying indications of when said digital electric signals in said first series specify first coordinates in ranges wherein lie said selected regions, in at least certain of which selected regions those digital electric signals differ from the desired display memory column addresses by a respective offset; and, for each range wherein lies one of those certain regions,
   means responsive to the indication of one of said digital electric signals of said first series being in that range for combining said offset with that digital electric signal to generate the appropriate column address for said display memory.

3. Apparatus for generating a video signal as set forth in claim 1 or 2 wherein q is smaller than n; wherein said means responsive to digital electric signals in said second series for generating corresponding row addresses includes
   means for omitting at least one place from each digital electric signal in said second series to generate said row address; and wherein said means for supplying an alternate source of video samples includes
   means responsive to each omitted place to indicate said digital electric signals in said second series to be other than one of the q selected ones.

4. Apparatus for generating a video signal as set forth in claim 3 wherein said means for supplying an alternate source of video samples comprises:
   means for determining when phantom raster scan coordinates fall in a non-selected region of said display area flanked by two selected regions within the same range of first coordinates of phantom raster scan; and means responsive to such determination for addressing said display memory with a row address corresponding to that of the row in one of said two selected regions closest to the non-selected region the selected regions flank, and with a column address generated in the same way as for the two flanking selected regions.

5. Apparatus for generating a video signal as set forth in claim 1 or 2 wherein said means for supplying an alternate source of video samples comprises:
   means for determining when phantom raster scan coordinates fall within a non-selected region of said display area flanked by two selected regions in the same range of second coordinates of phantom raster scan; and
   means responsive to such determination for addressing said display memory with a column address corresponding to that of the column in one of said two selected regions closest to the non-selected region, the selected regions flank and with a row address generated in the same way as for the two flanking selected regions.

6. Apparatus for generating a video signal as set forth in claim 1 wherein said means for supplying an alternate source of video samples comprises:
   means for determining when phantom raster scan coordinates fall in a non-selected region of said display area; and
   means responsive to such determination for applying predetermined row and column addresses to said display memory to condition it for reading out a point in a selected region corresponding to all points in said non-selected region.

* * * * *